United States Patent
Lee et al.

(10) Patent No.: US 10,277,502 B2
(45) Date of Patent: Apr. 30, 2019

(54) SLAVE DEVICE CONTROL METHOD

(71) Applicant: LSIS CO., LTD., Gyeonggi-do (KR)

(72) Inventors: Ji-Geon Lee, Gyeonggi-do (KR); Sung-Han Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 95 days.

(21) Appl. No.: 15/384,848

(22) Filed: Dec. 20, 2016

(65) Prior Publication Data

US 2017/0331726 A1 Nov. 16, 2017

(30) Foreign Application Priority Data

May 10, 2016 (KR) .................. 10-2016-0057163

(51) Int. Cl.
*H04L 12/721* (2013.01)
*H04L 12/751* (2013.01)
*H04L 12/18* (2006.01)
*H04L 12/46* (2006.01)
*H04L 12/403* (2006.01)

(52) U.S. Cl.
CPC .............. *H04L 45/26* (2013.01); *H04L 12/18* (2013.01); *H04L 12/403* (2013.01); *H04L 12/4625* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 2008/0123647 A1* | 5/2008 | Chen ................ | H04L 12/185 370/390 |
| 2011/0167142 A1 | 7/2011 | Patel et al. | |
| 2012/0039339 A1* | 2/2012 | Kurita ................ | H04L 45/00 370/400 |
| 2012/0239824 A1 | 9/2012 | Nguyen et al. | |
| 2013/0034104 A1 | 2/2013 | Yedavalli et al. | |
| 2013/0182707 A1 | 7/2013 | Angst et al. | |
| 2013/0242987 A1 | 9/2013 | Basso et al. | |
| 2014/0269636 A1* | 9/2014 | Jain ................... | H04W 72/0446 370/336 |

(Continued)

FOREIGN PATENT DOCUMENTS

| | | |
|---|---|---|
| EP | 2124393 A1 | 11/2009 |
| EP | 2622775 B1 | 2/2014 |
| JP | H10243029 A | 9/1998 |

(Continued)

OTHER PUBLICATIONS

European search report dated Jul. 10, 2017 for corresponding EP application 16197084.3.

(Continued)

*Primary Examiner* — Huy D Vu
*Assistant Examiner* — Bao G Nguyen
(74) *Attorney, Agent, or Firm* — K&L Gates LLP

(57) ABSTRACT

The present disclosure relates to a slave device control method, for transmitting a control message along with group start data and group end data to a slave device by a master device so as to set a start point and an end point of the slave device in a sub group, and for allowing the master device to check a network topology using a topology collection message so as to effectively generate a sub group.

13 Claims, 9 Drawing Sheets

(56) References Cited

U.S. PATENT DOCUMENTS

2014/0269744 A1    9/2014   Flanders et al.
2017/0222829 A1*   8/2017   Kessler .................. H04L 12/43

FOREIGN PATENT DOCUMENTS

| | | |
|---|---|---|
| JP | 2009117899 A | 5/2009 |
| JP | 2010287959 A | 12/2010 |
| JP | 2015049815 A | 3/2015 |
| JP | 2015111790 A | 6/2015 |
| KR | 101503209 B1 | 3/2015 |
| KR | 101514054 B1 | 4/2015 |
| WO | 2010073346 A1 | 7/2010 |
| WO | 2015166953 A1 | 11/2015 |

OTHER PUBLICATIONS

Japanese Office Action for related Japanese Application No. 2016-235390; action dated Oct. 24, 2017.

Partial European Search Report dated Apr. 21, 2017 corresponding to application No. 16197084.3-1862.

* cited by examiner

Master → M
Slave1 → S1
Slave2 → S2
Slave3 → S3

PRIOR ART

SLAVE DEVICE CONTROL METHOD

CROSS REFERENCE TO RELATED APPLICATION

This application claims the benefit of Korean Patent Application No. 10-2016-0057163, filed on May 10, 2016, entitled "SLAVE DEVICE CONTROL METHOD", which is hereby incorporated by reference in its entirety into this application.

BACKGROUND

1. Technical Field

The present disclosure relates to a slave device control method.

2. Description of the Related Art

When there is a plurality of devices connected via a network, the devices are generally classified into a master device and a slave device. A user allows a master device to monitor an operation of a slave device or to transmit commands or data required by the slave device. In general, when there are many slave devices on a network, a master device transmits a control message to each slave device to control the slave device.

However, as the number of slave devices increases, a master device M needs to generate more control messages and to transmit the control messages to each slave device. Accordingly, it is disadvantageous to increase data traffic and, thus, a data transmission time increases and real-time control is difficult.

In order to overcome such a problem, a data transmissions method using EtherCAT communication is used.

In an EtherCAT communication configuration, slave devices S1 to S4 transmit a control message transmitted from a master device 10 to a next slave device via a cut-through method.

Here, the cut-through method is a scheme of transmitting a message to a destination immediately upon checking a destination address of a received message in order to minimize transmission standby time of the message.

In the data transmission method using EtherCAT communication, a master device simply generates one control message irrespective of increase in the number of slave devices. Accordingly, an existing problem in terms of increased data traffic is overcome and a data transmission time through a hardware switching method (cut-through) may be reduced.

However, during transmission of a control message between slave devices, a slave device may not transmit another control message in order to prevent data collision.

In addition, a size of a field for storing input data of each slave device is fixed and, thus, there is a limit in a size of data to be transmitted during transmission of a control message generated by a master device. It is disadvantageous that a size of a data field allocated to each of the slave devices S1 to S4 is reduced when the number of the slave devices S1 to S4 in a network increases.

As the number of slave devices increases, transmission delay of a control message is linearly increased and, thus, there is a problem in that it is difficult to control the slave devices in real time.

In order to overcome this problem, a master device generates a control message for each group by grouping slave devices to a plurality of groups and provides the control message to the corresponding group. Accordingly, as soon as each group receives a control message, the mater device transmits a control message to a next group. After the control message is completely transmitted, extraction of group data, extraction of output data, and record of input data, which will be described below, are performed.

Accordingly, a time taken to receive a control message by each group may be minimized and even if the number of slave devices is increased, increase in data traffic may be reduced.

As described above, a response procedure of each slave device to a master device, that is, record of input data and transmission of group data is performed in group units. Accordingly, it may be advantageous that a data transmission time is reduced and control speed of a slave device is increased compared with a prior art for performing a response procedure in a unit of a separate slave device.

However, there is a need for a network topology collecting method for grouping slave devices and there is a need for a method of setting a start point and end point of a sub group.

SUMMARY

It is an object of the present disclosure to provide a slave device control method, for transmitting a control message along with group start data and group end data to a slave device by a master device so as to set a start point and an end point of the slave device in a sub group.

It is another object of the present disclosure to provide a slave device control method, by which a master device is capable of checking a network topology using a topology collection message and thus effectively generates a sub group.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a slave device control method of a system including a master device and slave device sorted into a plurality of groups includes generating a control message including group start data, group end data, and output data to be transmitted to the slave device and transmitting the control message to a specific group among the plurality of groups, by the master device, transmitting the control message to a next group, by a slave device belonging to the specific group, transmitting the control message to the next group and then extracting group information corresponding to the slave device from the control message, by the slave device belonging to the specific group, and processing the control message according to the group information, by the slave device belonging to the specific group.

DETAILED DESCRIPTION

Figure 1:
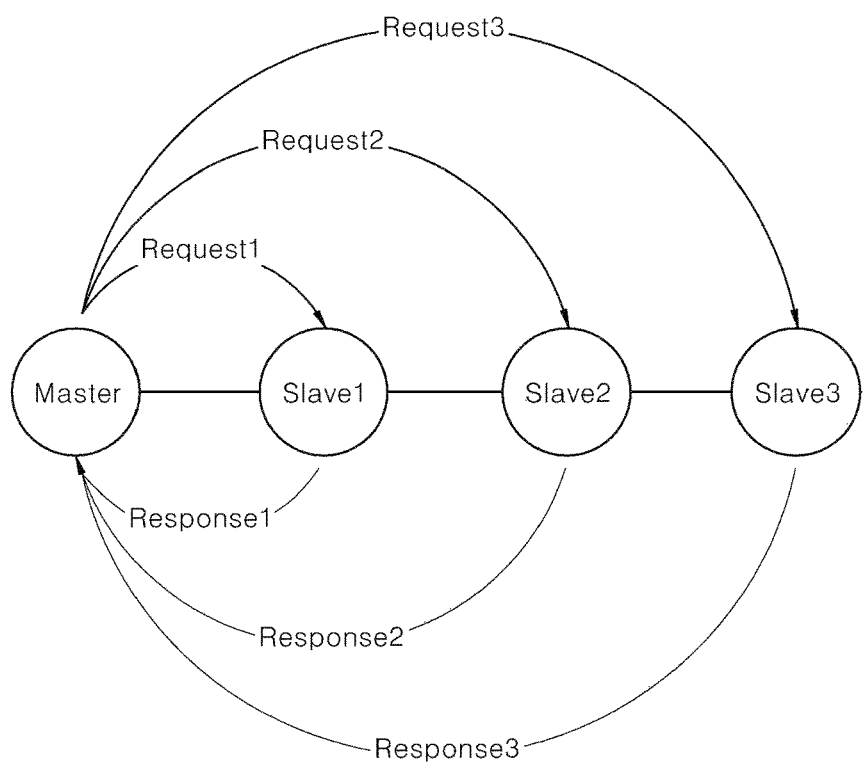
FIG. 1 is a reference diagram for explanation of a data transmission method between a master device and a slave device.

The above objects, features and advantages will become apparent from the detailed description with reference to the accompanying drawings. Embodiments are described in sufficient detail to enable those skilled in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 is a reference diagram for explanation of a data transmission method between a master device and a slave device.

Referring to FIG. 1, a master device M may generate control messages corresponding to the number of slave devices present in a network and transmit the generated control messages to the slave devices S1 to S4, respectively. The slave devices S1 to S4 may apply the control messages received from the master device M to the slave devices S1 to S4 or transmit output data requested by the master device M to the master device M.

In this case, the master device M needs to generate control messages by as much as the number of the slave devices S1 to S4 in a network and to transmit the control messages to the slave devices S1 to S4, respectively.

However, as the number of the slave devices S1 to S4 increases, the master device M needs to generate more control messages and to transmit the control messages to the slave devices S1 to S4, respectively. Accordingly, it may be disadvantageous that data traffic increases and, thus, a data transmission time is increased and real-time control is difficult.

In order to overcome such a problem, a data transmissions method using EtherCAT communication is used.

Figure 2:
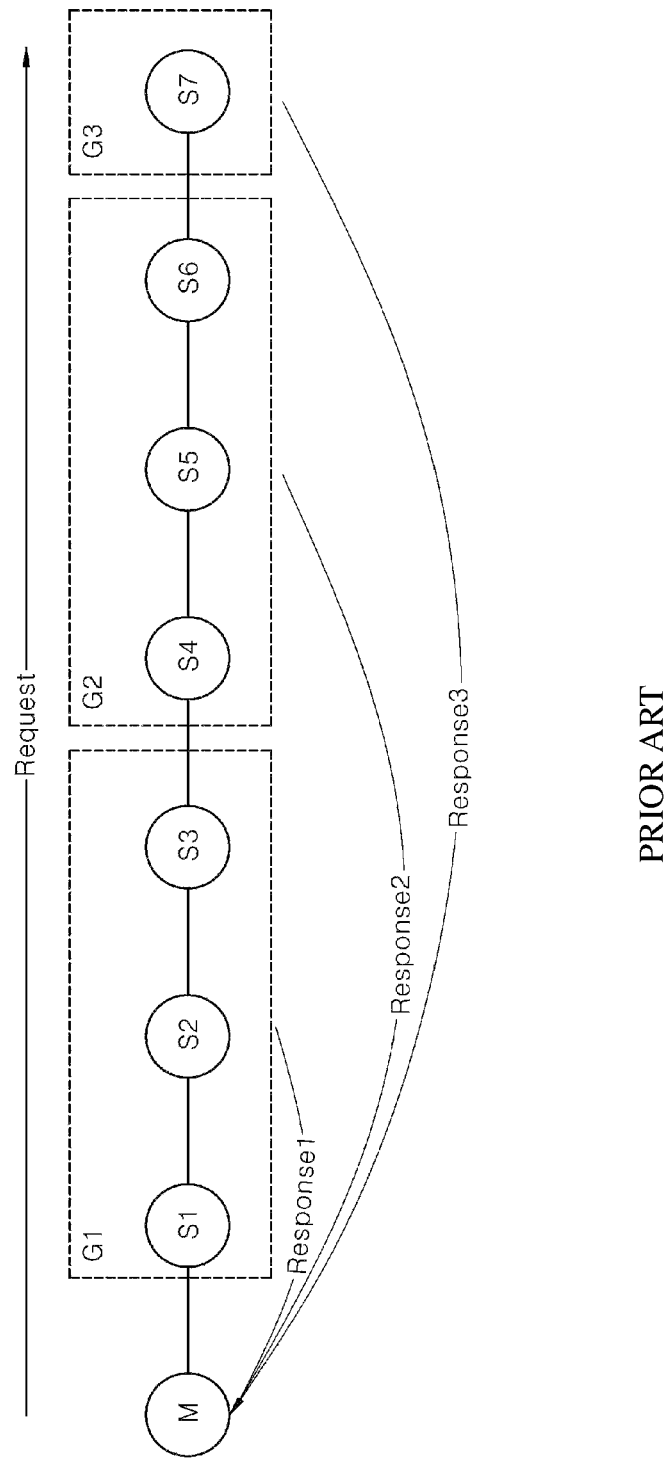
FIGS. 2 and 3 are reference diagrams for explanation of a data transmission method between a master device and a slave device.
Figure 3:
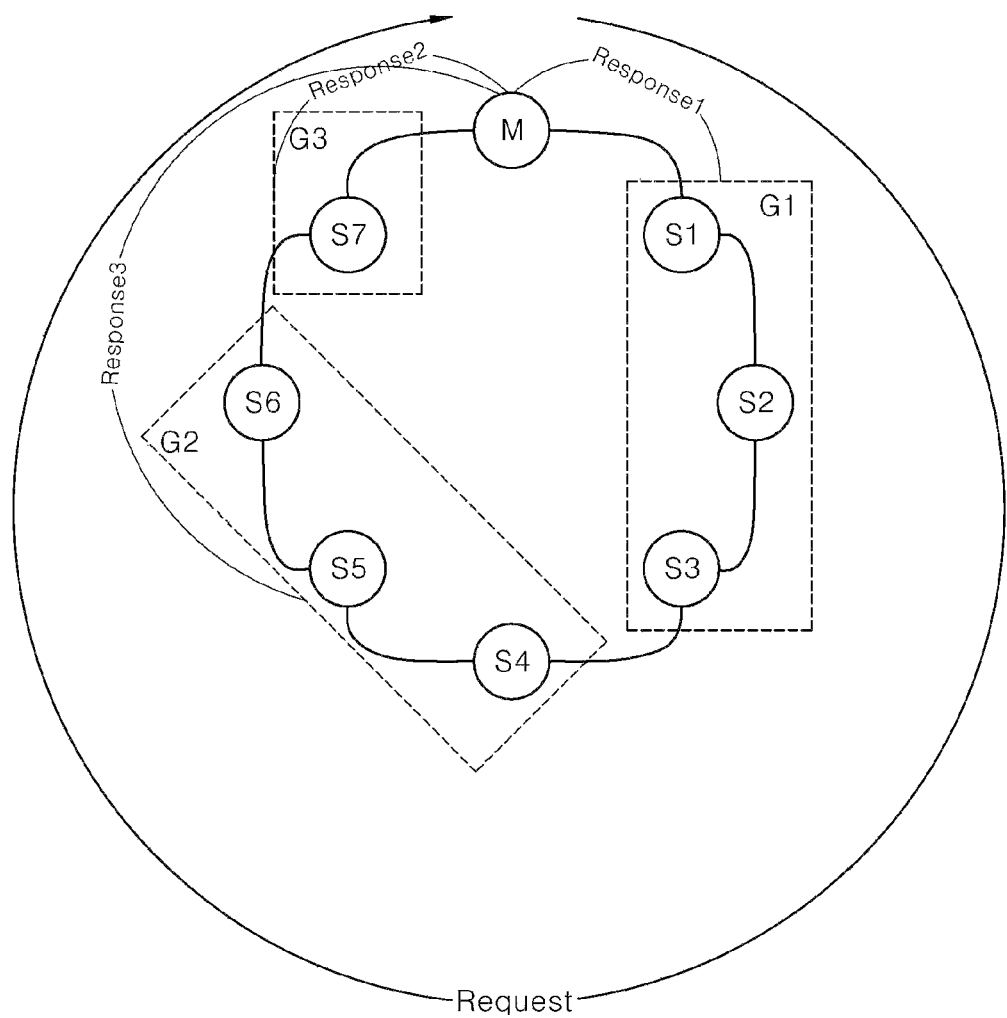

FIGS. 2 and 3 are reference diagrams for explanation of a data transmission method between a master device and a slave device.

Referring to FIGS. 2 and 3, slave devices S1 to S7 may be grouped to a plurality of groups G1, G2, and G3. In FIG. 3, a first group G1 may include the slave devices S1, S2, and S3, a second group G2 may include the slave devices S4, S5, and S6, and a third group G3 may include the slave device S7.

Accordingly, the master device M may divide and generate a control message into first group data to third group data. The first group data may include output data to be transmitted to the slave devices S1, S2, and S3 that belong to the first group G1. The second group data may include output data to be transmitted to the slave devices S4, S5, and S6 that belong to the second group G2. The third group data may include output data to be transmitted to the slave device S7 that belong to the third group G3. The master device M may package the first group data to the third group data to generate a control message and transmit the generated control message to the first group G1.

The slave device S1 of the first group G1 may receive a control message from the master device M. In this case, when a minimum standby time elapses after the slave device S1 receives the control message, the slave device S1 may transmit the control message to a next group G2. That is, upon receiving control messages, each of the groups G1, G2, and G3 may perform data processing (output data extraction or input data record) and then transmit the control message to a next group. Alternatively, each of the groups G1, G2, and G3 may immediately transmit a control message before extracting each group data item from the control message.

Accordingly, each group may transmit a control message to a next group as soon as receiving the control message. After control message transmission is completed, group data extraction, output data extraction, and input data record, which will be described below, may be performed. Accordingly, a time taken to receive a control message by each of the groups G1, G2, and G3 may be minimized and increase in data traffic may be minimized even if the number of slave devices increases.

The slave device S1 may extract output data from the first group data extracted from the control message. In addition, the slave device S1 may generate input data to be transmitted to the master device M with a predefined data size and record the input data in the first group data. Then, the slave device S1 may transmit the first group data in which the input data is recorded, to a next slave device S2 in the same group G1.

The slave device S2 may receive the first group data from the slave device S1 and extract output data. In addition, the slave device S2 may generate input data to be transmitted to the master device M with a predefined data size and record the input data in the first group data. Then, the slave device S2 may transmit the first group data in which the input data is recorded to a next slave device S3 in the same group G1.

The slave device S3 may receive the first group data from the slave device S2 and extract output data. In addition, the slave device S3 may generate input data to be transmitted to the master device M with a predefined data size and record the input data in the first group data. Then, the slave device S3 may set a destination address of the first group data as an address of the master device M and transmit the first group data to the master device M.

The first group data transmitted by the slave device S3 may be transmitted to the master device M through the second group G2 or transmitted directly to the master device M without passing through the second group G2.

Such processing and transmitting procedures of a control message are performed in the same way as in the second group G2 and the third group G3 and, thus, a detailed description thereof will be omitted here.

The master device M may check whether each slave device is normally operated through input data recorded in group data transmitted from each of the groups G1, G2, and G3.

As described above, a response procedure of each of the slave devices S1 to S7 to the master device M, that is, input data record and group data transmission may be performed in group units. Accordingly, it may be advantageous that a data transmission time is reduced and control speed of a slave device is increased compared with a prior art for performing a response procedure in a unit of a separate slave device.

However, there is a need for a network topology collecting method for grouping slave devices and there is a need for a method of setting a start point and end point of a sub group.

Figure 4:
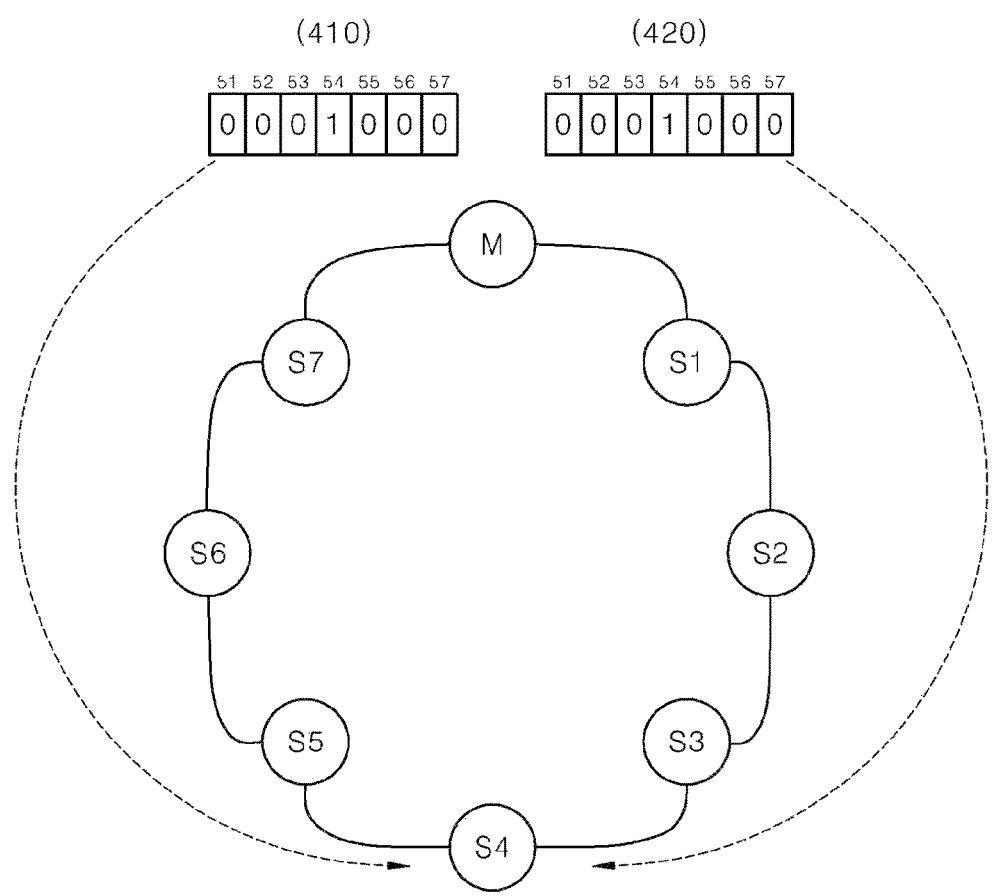
FIGS. 4 and 5 are reference diagrams for explanation of a network topology collection procedure of a slave device according to an exemplary embodiment of the present disclosure.
Figure 5:
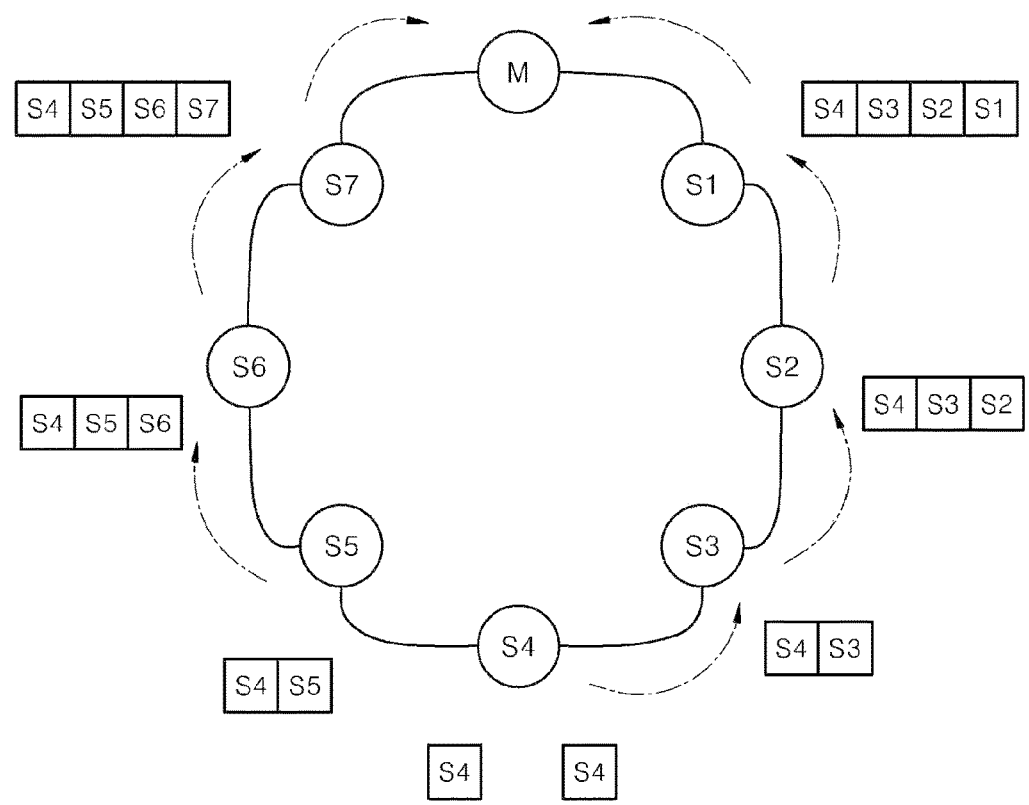

FIGS. 4 and 5 are reference diagrams for explanation of a network topology collection procedure of a slave device according to an exemplary embodiment of the present disclosure. The exemplary embodiment illustrated in FIGS. 4 and 5 relates to collection of network topology of a slave device by a master device when the slave device configures ring topology.

Referring to FIGS. 4 and 5, the master device M may generate topology collection messages 410 and 420 corresponding to the number of slave devices present in a network. In addition, the master device M may set a flag in a region of the topology collection messages 410 and 420, which corresponds to an arbitrary slave device, and transmit a topology collection message in broadcast. Here, broadcast refers to simultaneous transmission of one message to a plurality of devices. That is, the master device M may simultaneously transmit the same topology message to all slave devices having the same network address.

For example, the master device M may generate the topology collection messages 410 and 420 corresponding to seven devices present in a network. In addition, the master device M may set a flag of a region of the topology collection messages 410 and 420, which corresponds to the slave device S4, to "1". In addition, the master device M may transmit a topology message to all slave devices having the same network address. Upon receiving the topology collection messages 410 and 420 from the master device M, the slave devices S1 to S7 may check whether a flag is set in a region of a corresponding slave device among a plurality of regions of the topology collection message. According to a check result, the slave devices S1 to S7 may transmit the topology collection message to a next slave device or may allocate an identifier of a slave device to a response message and transmit the response message to a next slave device.

For example, as illustrated in FIG. 4, upon receiving the topology collection message 420 from the master device M, the slave device S1 may check whether a flag is set in a region corresponding to S1 among a plurality of regions of the topology collection message. The flag is not set in the region corresponding to S1 and, thus, the slave device S1 may transmit the topology collection message 420 to the next slave device S2.

The slave device S2 may check whether a flag is set in a region corresponding to S2 among a plurality of regions of the topology collection message 420. The flag is not set in the region corresponding to S2 and, thus, the slave device S2 may transmit the topology collection message 420 to the next slave device S3.

The slave device S3 may check whether a flag is set in a region corresponding to S3 among a plurality of regions of the topology collection message 420. The flag is not set in the region corresponding to S3 and, thus, the slave device S3 may transmit the topology collection message 420 to the next slave device S4.

The slave device S4 may check whether a flag is set in a region corresponding to S4 among a plurality of regions of the topology collection message 420. The flag is set in the region corresponding to S4 and, thus, the slave device S4 may allocate an identifier S4 of a slave device to a response message and then transmit the response message S4 to next slave devices S3 and S5.

Upon receiving a response message S4 from the slave device S4, the slave device S5 may allocate an identifier S5 of a slave device to a response message and then transmit the response messages S4 and S5 to the next slave device S6.

Upon receiving the response messages S4 and S5 from the slave device S5, the slave device S6 may allocate an identifier S6 of a slave device to the response messages S4 and S5 and then transmit the response messages S4, S5, and S6 to the next slave device S7.

Upon receiving the response messages S4, S5, and S6 from the slave device S6, the slave device S7 may allocate an identifier S7 of a slave device to the response messages S4, S5, and S6 and then transmit the response messages S4, S5, S6, and S7 to the master device M.

A procedure of allocating an identifier of a corresponding slave device to a response message by the slave device S3 to the slave device S1 and then processing a response message is performed in the same way and, thus, a detailed description thereof will be omitted here.

Accordingly, the master device M may recognize a topology configuration in a network through a slave identifier of a response message received from the slave device S4. For example, the master device M may recognize that slave devices are configured in an order of S1, S2, S3, S4, S5, S6, and S7 using the first response messages S4, S5, S6, and S7 and the second response messages S4, S3, S2, and S1, which are received from the slave device S4.

Figure 6:
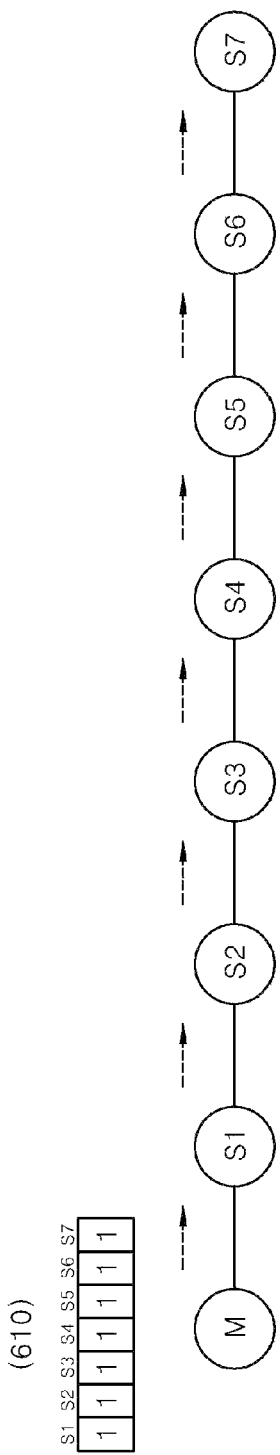
FIGS. 6 and 7 are reference diagrams for explanation of a network topology collecting method of a slave device according to another exemplary embodiment of the present disclosure.
Figure 7:
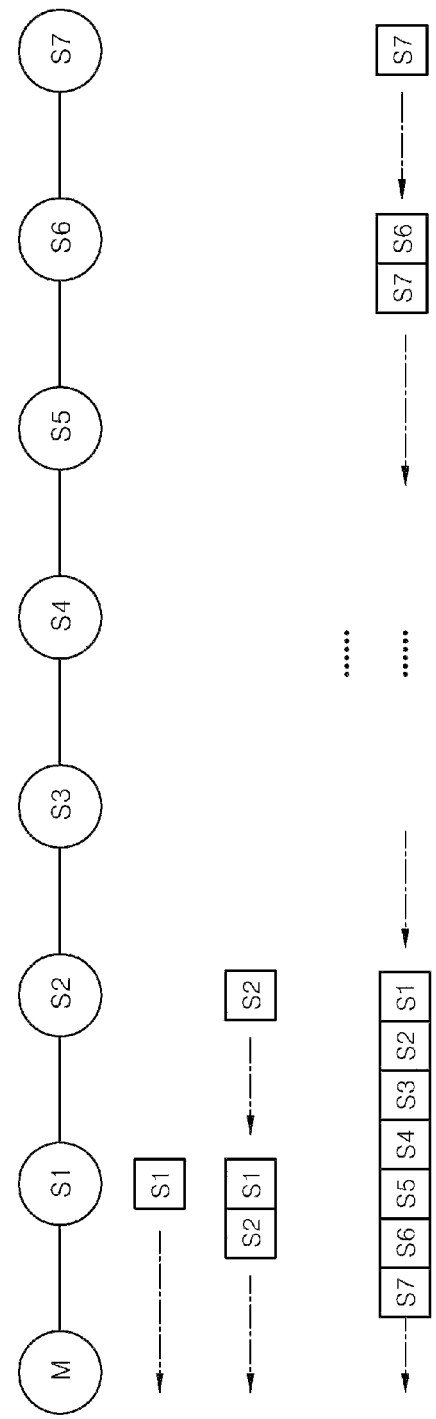

FIGS. 6 and 7 are reference diagrams for explanation of a network topology collecting method of a slave device according to another exemplary embodiment of the present disclosure. The exemplary embodiment illustrated in FIG. 6 and relates to collection of network topology of a slave device by a master device when the slave device configures data chain topology.

Referring to FIGS. 6 and 7, the master device M may generate a topology collection message 610 corresponding to the number of slave devices present in a network. In addition, the master device M may set a flag in a region of the topology collection message 610, which corresponds to an arbitrary slave device, and transmit a topology collection message in broadcast.

For example, the master device M may generate the topology collection message 610 corresponding to seven devices present in a network. In addition, the master device M may set a flag of a region of the topology collection message 610, which corresponds to each of the slave devices S1 to S7, to "1". In addition, the master device M may transmit the topology collection message 610 in broadcast.

Upon receiving the topology collection message 610 from the master device M, the slave devices S1 to S7 may check whether a flag is set in a region of a corresponding slave device among a plurality of regions of the topology collection message 610. According to a check result, the slave devices S1 to S7 may transmit the topology collection message 610 to a next slave device or may allocate an identifier of a slave device to a response message and transmit the response message to a next slave device.

For example, as illustrated in FIG. 7, the slave device S1 may check whether a flag is set in a region of the topology collection message 610, which corresponds to S1 among a plurality of regions. The flag is set in the corresponding to S1 and, thus, the slave device S1 may allocate an identifier S1 of a slave device to a response message and then transmit a response message S1 to the master device M.

The slave device S2 may check whether a flag is set in a region corresponding to S2 among a plurality of regions of the topology collection message 610. The flag is set in the corresponding to S2 and, thus, the slave device S2 may allocate an identifier S2 of a slave device to a response message and then transmit a response message S2 to the slave device S1. Then, the slave device S1 may allocate the identifier S1 of a slave device to the response message S2 received from the slave device S2 and then transmit the response messages S2 and S1 to the master device M.

The slave device S3 may check whether a flag is set in a region corresponding to S3 among a plurality of regions of the topology collection message 610. The flag is set in the corresponding to S3 and, thus, the slave device S3 may allocate an identifier S3 of a slave device to a response message and then transmit the response message S3 to the slave device S2.

Then, the slave device S2 may allocate the identifier S2 of a slave device to the response message S3 received from the slave device S3 and then transmit the response messages S3 and S2 to the slave device S1. The slave device S1 may allocate the identifier S1 of a slave device to the response messages S3 and S2 received from the slave device S2 and then transmit the response messages S3, S2, and S1 to the master device M.

The slave device S4 to the slave device S7 may transmit a response message to the master device M through the aforementioned procedure and, a detailed description thereof will be omitted here.

Accordingly, the master device M may recognize a topology configuration in a network through response messages received from the slave devices S1 to S7. For example, the master device M may recognize that a slave device is configured in an order of S1, S2, S3, S4, S5, S6, and S7 using the first response message S1 received from the slave device S1, the second response messages S2 and S1 received from the slave device S2, the third response messages S3, S2, and S1 received from the slave device S3, the fourth response messages S4, S3, S2, and S1 received from the slave device S4, the fifth response messages S5, S4, S3, S2, and S1 received from the slave device S5, the sixth response messages S6, S5, S4, S3, S2, and S1 received from the slave device S6, and the seventh response messages S7, S6, S5, S4, S3, S2, and S1 received from the slave device S7.

Figure 8:
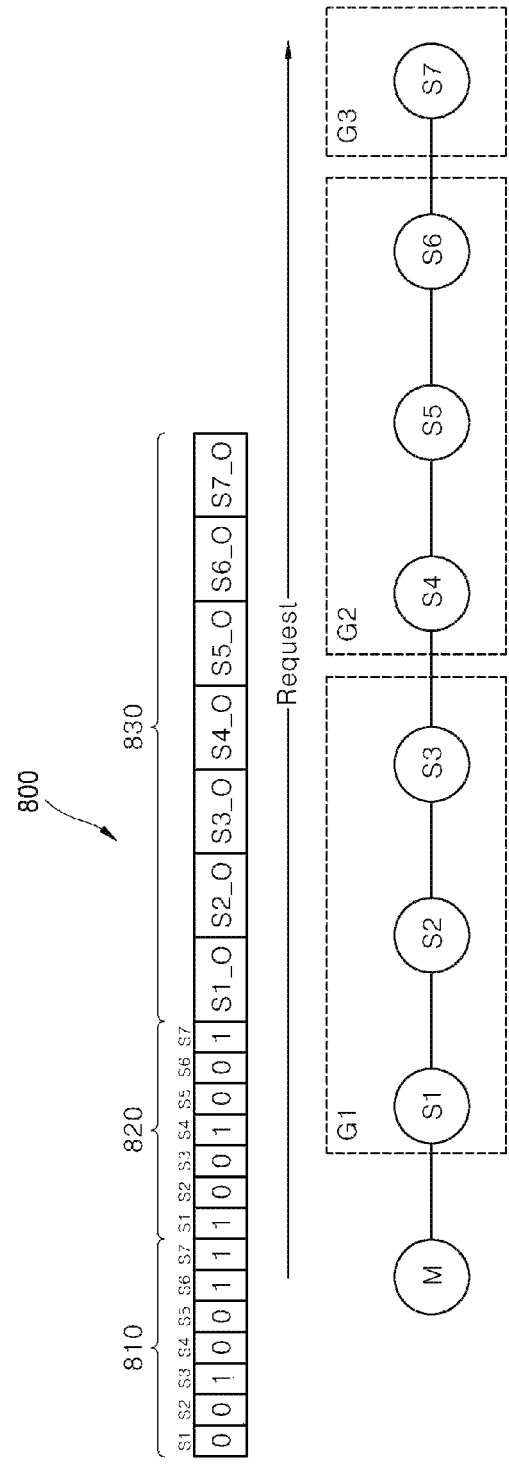
FIGS. 8 and 9 are reference diagrams for explanation of a data transmission method between a master device and a slave device according to an exemplary embodiment of the present disclosure.
Figure 9:
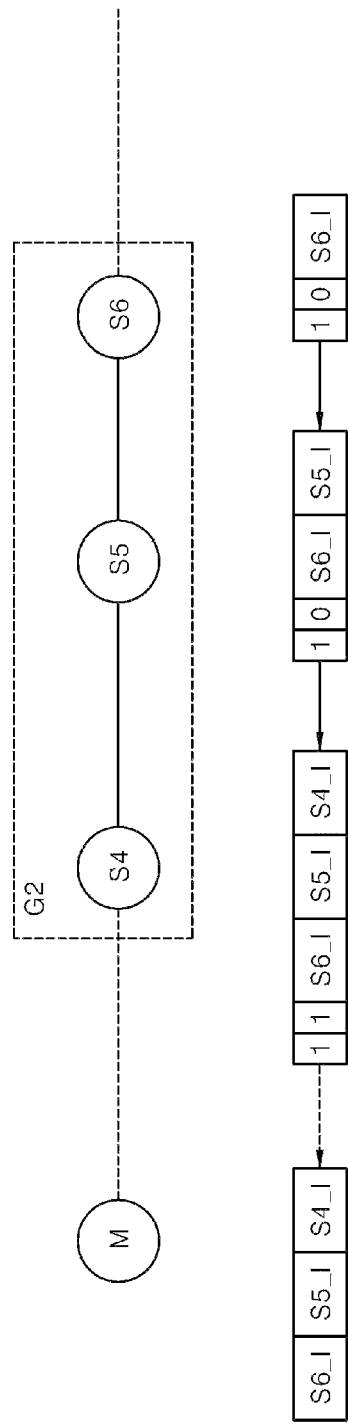

FIGS. 8 and 9 are reference diagrams for explanation of a data transmission method between a master device and a slave device according to an exemplary embodiment of the present disclosure.

Referring to FIG. 8, the master device M may check a topology configuration of a slave device, acquired through the procedures of FIGS. 4 to 7, and then group the slave device to a plurality of groups. Then, group start data 810, group end data 820, and output data 830 may be packetized to generate a control message.

For example, a group start slave device of each of group G1, group G2, and group G3 may be S1, S4, and S7 and a group end slave device of each of group G1, group G2, and group G3 may be S3, S6, and S7. In this case, a control message 800 may include the group start data 810 in which a group start flag is set in a corresponding to S1, S4, and S7 among a plurality of regions. The control message 800 may include the group end data 820 in which a group end flag is set in a region corresponding S3, S6, and S7 among a plurality of regions. The control message 800 may include output data (S1_O to S7_O) 830 to be transmitted to the slave devices S1 to S7.

The master device M may packetize the group start data 810, the group end data 820, and the output data (S1_O to S7_O) 830 to generate the control message 800 and transmit the generated control message 800 to the first group G1.

The slave device S1 of the first group G1 may receive the control message 800 from the master device M. In this case, when a minimum standby time elapses after the slave device S1 receives the control message 800, the slave device S1 may transmit the control message 800 to the next group G2.

When a minimum standby time elapses after the slave device S4 of the second group G2 receives the control message 800 from the first group G1, the slave device S4 may transmit the control message 800 to the third group G3.

The slave device S4 of the second group G2 may check whether a group start flag is set in a region corresponding to the slave device S6 with reference to the group start data 810. In addition, the slave device S4 may check whether a group end flag is set in a region corresponding to the slave device S4 with reference to the group end data 820.

The group end data is allocated to a region corresponding to the slave device S4 among a plurality of regions of the group end data 820 and, thus, the slave device S4 may be set as a group end slave of the second group G2. Then, the slave device S4 may extract output data S4_O from the control message 800 and transmit the control message 800 to the slave device S5 in the second group G2.

The slave device S5 of the second group G2 may check whether a group start flag is set in a region corresponding to the slave device S5 with reference to the group start data 810. The slave device S5 may check whether a group end flag is set in a region corresponding to the slave device S5 with reference to the group end data 820.

The group start flag is not set in a region corresponding to the slave device S5 among a plurality of regions of the group start data 810 and the group end flag is not set in a region corresponding to the slave device S5 among a plurality of regions of the group end data 820 and, thus, the slave device S5 may extract output data S5_O from the control message 800 and transmit the control message 800 to the slave device S6 in the second group G2.

The slave device S6 of the second group G2 may check whether a group start flag is allocated to a region corresponding to the slave device S6 with reference to the group start data 810. In addition, the slave device S6 may check whether a group end flag is set in a region corresponding to the slave device S6 with reference to the group end data 820.

The group start flag is set in a region corresponding to the slave device S6 with reference to the group start data 810 and, thus, the slave device S6 may be set as a group start slave of the second group G2.

The slave device S6 set as a group start slave may extract output data S6_O from the control message 800. The slave device S6 may generate a group response message 910, record input data S6_I in a group response message, and transmit the group response message to the slave device S5 in a group. The group response message may include a group response start flag indicating group response start and a group response end flag indicating group response end.

According to the group response start flag and the group response end flag, upon receiving a group response message, a slave device in another group recognizes whether the received group response message is a group response message corresponding to another group according to whether a flag is set and transmits input data to the master device M without recording input data in the group response message.

Then, the slave device S6 may set a group response start flag, record the input data S6_I in the group response message and, then transmit the input data S6_I to the slave device S5 in a group.

The slave device S5 of the second group G2 is not set as a start slave or an end slave and, thus, may record input data S53 in a group response message and transmit group response message to the slave device S4 in a group.

The slave device S4 of the second group G2 is set as a start slave and, thus, may set a group response end flag, record input data S4_I in a group response message 900 and then transmit the group response message 900 to the master device M.

According to the aforementioned present disclosure, it may be advantageous that a master device is capable of checking a network topology using a topology collection message and thus effectively generates a sub group. According to the present disclosure, it may be advantageous that the master device transmits a control message along with group start data and group end data to a slave device and thus sets a start point and an end point of the slave device in a sub group.

According to the present disclosure, it may be advantageous that a master device is capable of checking a network topology using a topology collection message and thus effectively generates a sub group.

In addition, according to the present disclosure, it may be advantageous that the master device transmits a control message along with group start data and group end data to a slave device and thus sets a start point and an end point of the slave device in a sub group.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A slave device control method of a system comprising a master device and slave devices sorted into a plurality of groups, the method comprising:
   generating, by the master device, a control message comprising group start data including group start flags corresponding to the number of the slave devices, group end data including group end flags corresponding to the number of the slave devices, and output data to be transmitted to the slave devices and transmitting the control message to a specific group among the plurality of groups;
   transmitting the control message to a next group, by a slave device belonging to the specific group;
   transmitting the control message to the next group and then checking whether a group start flag is set in a region corresponding to the slave device with reference to the group start data, and a group end flag is set in a region corresponding to the slave device with reference to the group end data, by the slave device belonging to the specific group; and
   processing the control message according to whether the group start flag or the group end flag is set in the region of each of the group start data and the group end data, by the slave device belonging to the specific group.

2. The method according to claim 1, wherein the processing comprises:
   setting the slave device as a group end slave when the group end flag is set in a region of the group end data, corresponding to the slave device; and
   extracting output data from the control message and transmitting the output data to a slave device in the group.

3. The method according to claim 1, wherein the processing comprises extracting output data from the control message and transmitting the output data to a slave device in the group when a group end flag is not set in a region to each of the group end data and the group start data, corresponding to the slave device.

4. The method according to claim 1, wherein the processing comprises:
   setting the slave device as a group start slave when a group start flag is set in the region corresponding to the group start data, corresponding to the slave device;
   extracting output data from the control message; and
   recording input data in a group response message and transmitting the group response message to a slave device in a group.

5. The method according to claim 4, wherein the recording comprises:
   generating a group response message comprising a group response start flag and a group response end flag; and
   setting the group response start flag of the group response message, recording input data in the group response message, and transmitting the group response message to the slave device in the group.

6. The method according to claim 4, wherein the recording comprises:
   checking whether a group response end flag is set in the group response message when the slave device is not set as a start slave or an end slave; and
   recording input data in the group response message and transmitting the group response message to the slave device in the group when the group response end flag of the group response message is not set, as a result of the checking.

7. The method according to claim 6, wherein the recording comprises:
   setting the group response end flag of the group response message, recording input data in the group response message, and transmitting the group response message to the master slave device when the slave device is set as an end slave.

8. A network topology collecting method in a system comprising a master device and slave devices sorted into a plurality of groups, the method comprising:
   generating topology collection messages corresponding to a slave device present in a network, by the master device;
   setting a flag of a region of the topology collection messages, corresponding to a specific slave device, and transmitting the topology collection messages in broadcast, by the master device;
   checking whether a flag is set in a region of a corresponding slave device among a plurality of regions of the topology collection messages upon receiving the topology collection messages from the master device, by the slave device; and
   transmitting the topology collection messages to a next slave device or allocating an identifier of a slave device to a response message and transmitting the response message to a next slave device, according to the result of the checking.

9. The method according to claim 8, wherein the transmitting comprises:
   allocating the identifier of the slave device to a response message when a flag is set in a region of the slave device among a plurality of regions of the topology collection messages, by the slave device; and
   transmitting the response message to a next slave device.

10. The method according to claim 8, wherein the transmitting comprises transmitting the topology collection messages to a next slave device when a flag is not set in a region of the slave device among a plurality of regions of the topology collection messages, by the slave device.

11. The method according to claim 8, further comprising checking a topology configuration in a network through a slave identifier of a response message generated by the specific slave device, by the master device.

12. The method according to claim 8, further comprising:
setting a flag of the topology collection messages, corresponding to the slave device, and transmitting the topology collection messages to the slave device in broadcast;
checking whether a flag is set in a region of the slave device among a plurality of regions of the slave device, by the slave device; and
allocating an identifier of the slave device to the response message and transmitting the response message to a next slave device according to the result of the checking, by the slave device.

13. The method according to claim 12, further comprising checking a topology configuration through a slave identifier of a response message generated by the slave device, by the master device.

* * * * *